United States Patent
Goto et al.

[15] 3,684,752
[45] Aug. 15, 1972

[54] UNDERWATER ANTI-FOULING COATING COMPOSITION

[72] Inventors: Masahiro Goto, Nishinomiya-shi; Tetsuo Noto, Takarazuka-shi; Mitsuya Kato, Amagasaki-shi; Morio Kimura; Tadashi Watanabe, both of Hiratsuka-shi, all of Japan

[73] Assignee: Kansai Paint Company, Limited, Amagasaki-shi, Japan

[22] Filed: Dec. 9, 1969

[21] Appl. No.: 883,611

[30] Foreign Application Priority Data

Dec. 13, 1968  Japan ..................... 43/90874
Feb. 3, 1969   Japan ..................... 44/7359

[52] U.S. Cl. ......... 260/22 R, 106/15 AF, 117/132 R, 117/161 A, 117/161 K, 260/2 M, 260/22 T, 260/26, 424/288
[51] Int. Cl. .......... C09d 3/38, C09d 3/64, C09d 5/14
[58] Field of Search ... 106/15 AF; 424/288; 260/2 M, 260/22

[56] References Cited

UNITED STATES PATENTS

| | | | |
|---|---|---|---|
| 3,213,058 | 10/1965 | Boyle et al. | 260/47 |
| 3,214,280 | 10/1965 | Taylor | 106/15 |
| 3,249,565 | 5/1966 | Robitschek | 260/22 |
| 3,331,693 | 7/1967 | Taylor | 106/15 |
| 3,400,201 | 9/1968 | Mocotte | 424/288 |
| 3,417,181 | 12/1968 | Cardarelli | 424/229 |

FOREIGN PATENTS OR APPLICATIONS

| | | | |
|---|---|---|---|
| 1,017,670 | 1/1966 | Great Britain | 424/288 |
| 1,255,279 | 1/1961 | France | 424/288 |
| 1,001,369 | 8/1965 | Great Britain | 106/15 |

*Primary Examiner*—Donald E. Czaja
*Assistant Examiner*—Ronald W. Griffin
*Attorney*—Wenderoth, Lind & Ponack

[57] ABSTRACT

Underwater anti-fouling coating composition which contains a high molecular organic tin compound as an anti-fouling component and also as a film forming component, in which said high molecular organic tim compound is prepared by reacting an alkyd resin having free carboxyl groups and having a resin acid value of larger than 20 with organic tin oxide in an amount less than equivalent to said free carboxyl groups of said alkyd resin, thereby obtaining an underwater anti-fouling coating composition with superior anti-fouling effect and neither unpleasant odor nor irritating property, and further with good adhesiveness to the articles to be coated.

2 Claims, No Drawings

UNDERWATER ANTI-FOULING COATING COMPOSITION

This invention relates to an underwater anti-fouling coating composition which contains a high molecular organic tin compound as the effective underwater anti-fouling component and in which the high molecular weight organic tin compound is also effective as a film-forming material.

It is well known that generally lower trialkyl tin compounds have been used as the effective anti-fouling component in previous anti-fouling coating compositions and that they exhibit superior anti-fouling effects. However, these effective components have the defects of having an unpleasant odor and irritating property and also a strong physiological effect on men and beasts. Also, in the case of fishing nets, vinyl chloride resin or acryl resin was previously used as a binder in anti-fouling processing and a substance in which an inorganic or organic anti-fouling agent was mixed with this and coated. However, the weight of the fishing net increased considerably in this case depending on the components of the coating composition and also as the anti-fouling agent is enveloped in the resin which is the binder, the anti-fouling effects are reduced and the adhered organisms increase remarkably when the dipped period becomes long. Furthermore, the softness of the net was reduced and as the anti-fouling coating peeled and dropped off even by a slight impact, it was necessary to coat the net frequently.

The present inventors carried out extensive studies in view of the numerous faults in the previous anti-fouling coating compositions as mentioned above and as a result, succeeded in obtaining a novel underwater anti-fouling coating composition explained below to arrive at this invention.

This invention concerns an underwater anti-fouling coating composition which contains a high molecular organic tin compound as the effective anti-fouling component obtained by reacting an alkyd resin having free carboxyl groups in the molecule and which has a resin acid value larger than 20 and less than the equivalent amount with respect to the free carboxyl groups in the alkyd resin of an bis (triorgano tin) oxide having the general formula:

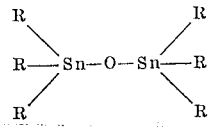

(wherein R is alkyl group of phenyl group having eight or less carbon atoms) or in which said high molecular organic tin compound is the film-forming element.

The effective anti-fouling component of this invention differs from low molecular trialkyl tin compounds and triphenyl tin compounds which were ordinary effective components, as it is hydrolyzed in slightly alkaline sea water to exhibit toxicity and thus has anti-fouling effects. Furthermore, the coating composition does not contain independent anti-fouling components as in the previous case but contains the anti-fouling component chemically combined with the resin and therefore does not exhibit detrimental effects on men or beasts, such as an unpleasant odor or irritating properties. Furthermore, when the coating composition of this invention is used, adhesiveness is improved due to the orientation of the carboxyl groups to the substrate for the remaining carboxyl groups in the resin. The film hydrolyzes to exhibit its toxicity and consequently, it is not particularly necessary to add another anti-fouling agent.

The alkyd resin having free carboxyl groups in the molecule which has a resin acid value larger than 20 used in this invention is manufactured by conventional methods. The proportion of triorgano tin oxide in the alkyd resin must be more than 5 wt%. The anti-fouling effect of the high molecular tin compound becomes remarkably lower when the proportion is below this, and consequently, the alkyd resin acid value must be larger than 20.

Bis(trialkyl tin) oxides such as bis(trimethyl tin) oxide, bis(triethyl tin) oxide, bis(tripropyl tin) oxide, bis(tributyl tin) oxide; oxide which have eight or less carbon atoms can be used as the bis(triorgano tin) oxide having the general formula:

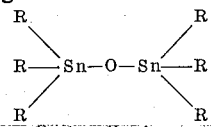

(wherein R is an alkyl radical or a phenyl radical having eight or less carbon atoms) which is reacted with the free carboxyl groups in the alkyd resin. Among these, bis(tripropyl tin) oxide and bis(tributyl tin) oxide are particularly good when the detrimental effects on man and also the beast during operation and anti-fouling effects are taken into consideration. Likewise, it is possible to use bis(triphenyl tin) oxide as the bis(triorgano tin) oxide.

Free carboxyl groups may be made to be present or not present in the high molecular organic tin compound. It is desirable to have some residual carboxyl groups when using the composition for coating fishing nets. In view of this, less than the equivalent amount of bis(triorgano tin) oxide with respect to the free carboxyl groups in the alkyd resin is reacted in this invention.

The dissolving velocity of the anti-fouling component of this invention in sea water can be adjusted as desired by changing the kind and reaction rate of the raw materials of the alkyd resin used, and the kind and reaction rate of the bis(triorgano tin) oxide which is condensed with this and consequently, it is possible to prolong the anti-fouling effects which is necessary in underwater anti-fouling coating compositions.

The high molecular organic tin compound may be used independently or by adding a pigment, additive or other resins if required as the film-forming elements or by adding the high molecular organic tin compound to the anti-fouling coating compositiion. Furthermore, the desired objective can be attained by using the high molecular organic tin compound of this invention together with well-known anti-fouling agents, and very good anti-fouling effect can be obtained when the underwater anti-fouling coating composition thus obtained is coated on the submerged portion of the outside plates of ships, underwater structures and fishing nets.

Next, this invention is described with examples. Parts or percents in the formulation examples and test examples refer to parts by weight and wt%.

EXAMPLE 1

Three hundred and eighty seven parts of phthalic anhydride, 337 parts of trimethylol ethane, 345 parts of linseed oil fatty acid and 50 parts of xylene were charged into a closed alkyd resin manufacturing apparatus provided with a thermometer, agitator and a device for removing condensation water, heated gradually with agitation and reacted for 5 hours at 230°C, the condensation water which forms removed from the reaction system together with xylene vapor and reacted until the resin acid value becomes below 10 to complete the first stage of esterification. Next, the content of the reactor was cooled to 180°C, 152 parts of phthalic anhydride and 230 parts of xylene added further and reacted for 1 hour at a temperature of 155°C to carry out the second stage esterification and diluted by adding 488 parts of xylene, by which alkyd resin with 60% solids and resin acid value of 60 was obtained (corresponds to 1.23 mol as carboxyl group). To this was added 365 parts of bis(tributyl tin) oxide (corresponds to 0.615 mol as bis(tributyl tin oxide) and 244 parts of xylene, reacted under relux for 4 hours at 140°–143°C while removing water, 10 parts of condensation water was removed to the condense alkyd resin and bis(tributyl tin) oxide almost quantitatively, and as a result, high molecular organic tin compound A of 60 percent solids and which is transparent and fluid was obtained. The bis(tributyl tin) oxide content of this compound A is 24.2 percent.

The high molecular organic tin compound A obtained here was used as it is as underwater anti-fouling coating composition of this invention.

EXAMPLE 2

Five hundred and thirty nine parts of phthalic anhydride, 337 parts of trimethylol ethane, 345 parts of soybean oil fatty acid and 50 parts of xylene were charged into the same reactor as in Example 1, heated slowly, reacted for 5 hours at 230°C until the resin acid value becomes 60 (corresponds to 1.23 mol as carboxyl group), cooled, 365 parts of bis (tributyl tin) oxide (corresponds to 0.615 mol bis (tributyl tin) oxide) and 750 parts of xylene were added and condensation of alkyd resin and bis(tributyl tin) oxide carried out in a similar manner as in Example 1, by which high molecular organic tin compound B of 65 percent solids content and which is transparent and fluid was obtained. The bis(tributyl tin) oxide content of this compound is 24.2 percent.

The high molecular organic tin compound B obtained here was used as it is as underwater anti-fouling coating composition of this invention.

EXAMPLE 3

Similar to the manufacturing method of Example 1, 344 parts of phthalic anhydride, 271 parts of trimethylol ethane, 309 parts of linseed oil fatty acid, 122 parts of Carbowax Polyethylene Glycol 1000 (product of Union Carbide Corporation, molecular weight 950 – 1,050), 17 parts of pentaerythritol and 50 parts of xylene were reacted for 5 hours at 230°C, 152 parts of phthalic anhydride and 230 parts of xylene were added further, reacted for 1 hour at 155°C to prepare an alkyd resin solution with a resin acid value of 60, (corresponds to 1.23 mol as carboxyl group) and diluted by adding 487 parts of xylene. Next, 189 parts of bis(tributyl tin) oxide (corresponds to 0.318 mol as bis(tributyl tin) oxide) and 113 parts of xylene were added and reacted for 4 hours at 140° – 143°C, by which high molecular organic tin compound C of 60 percent solids content and which is transparent and fluid was obtained. The bis(tributyl tin) oxide content of this compound C is 14.2 percent.

The high molecular organic tin compound C obtained here was used as it is as underwater anti-fouling coating composition of this invention.

EXAMPLE 4

Similar to the manufacturing method of Example 1, 268 parts of phthalic anhydride, 248 parts of pentaerythritol, 596 parts of linseed oil fatty acid and 50 parts of xylene were reacted for 5 hours at 230°C, 152 parts of phthalic anhydride and 230 parts of xylene were added further, reacted for 1 hour at 155°C to prepare an alkyd resin solution with a resin acid value of 60 (corresponds to 1.23 mol of carboxyl groups) and this resin solution was diluted by adding 487 parts of xylene. 189 parts of bis(tributyl tin) oxide (corresponds to 0.318 mol of bis(tributyl tin) oxide and 113 parts of xylene were added and reacted for 4 hours at 140°–143°C, by which high molecular organic tin compound D of 60 percent solids content and which is fluid was obtained. The bis(tributyl tin) oxide content of this compound D is 14.2 percent.

The high molecular organic tin compound D obtained here was used as it is as the underwater anti-fouling coating composition of this invention.

EXAMPLE 5

Three hundred and fourteen parts of bis(tripropyl tin) oxide (corresponds to 0.615 mol of bis(tripropyl tin) oxide) in place of bis(tributyl tin) oxide in Example 1 and 293 parts of xylene were reacted for 4 hours at 140°–143°C under reflux and while removing water, by which 10 parts of condensation water was removed and high molecular organic tin compound E of 60 percent solids content and which is transparent and fluid was obtained by condensation of alkyd resin and bis(tripropyl tin) oxide. The tripropyl tin oxide content of this compound E is 21.6 percent.

The high molecular organic tin compound E obtained here was used as it is as the underwater anti-fouling coating composition of this invention.

EXAMPLE 6

573 parts to bis(tri-n-octyl tin) oxide (corresponds to 0.615 mol of bis(tri-n-octyl tin) oxide) in place of bis(tributyl tin) oxide in Example 1 and 362 parts of xylene were reacted for 4 hours at 140°–143°C under relux and while removing water, by which 10 parts of condensation water was removed and high molecular organic tin compound F of 60 percent solids content and which is transparent and fluid was obtained by condensation of alkyd resin and bis(tri-n-octyl tin) oxide. The bis(tri-n-octyl tin) oxide content of this compound F is 33.4 percent.

The high molecular organic tin compound F obtained here was used as it is as underwater anti-fouling coating composition of this invention.

EXAMPLE 7

Similar to the manufacturing method of Example 1, 311 parts of phthalic anhydride, 372 parts of trimethylol ethane, 381 parts of dehydrated castor oil fatty acid and 50 parts of xylene were reacted for 5 hours at 230°C, 460 parts of phthalic anhydride and 230 parts of xylene were added further, reacted for 1 hour at 155°C to prepare an alkyd resin solution with resin acid value of 120 (corresponds to 3.12 mol of carboxyl groups) and diluted by adding 410 parts of xylene. Next, 446 parts of bis(tributyl tin) oxide (corresponds to 0.75 mol of bis(tributyl tin) oxide) and 100 parts of xylene were added to the diluted alkyd resin solution, and condensation carried out for 4 hours at 140°- 143°C, by which high molecular organic tin compound G of 70 percent solids content and which is transparent and fluid was obtained. The bis(tributyl tin) oxide content of this compound G is 23.6 percent.

The high molecular organic tin compound G obtained here was used as it is as underwater anti-fouling coating composition of this invention.

EXAMPLE 8

Similar to the manufacturing method of Example 1, 208 parts of isophthalic acid, 426 parts of pentaerythritol, 439 parts of linseed oil fatty acid and 50 parts of xylene were reacted for 5 hours at 230°C, 1,117 parts of phthalic anhydride and 1,361 parts of xylene were added further and reacted for 1 hour at 155°C to prepare a 60 percent alkyd resin solution having an acid value of 200 (corresponds to 7.547 mols of carboxyl groups). 2,241 parts of bis(tributyl tin) oxide (corresponds to 3.7735 mols of bis(tributyl tin) oxide) and 1,450 parts of xylene were added to this diluted resin solution and reacted for 4 hours at 140°- 143°C, by which high molecular tin compound H of 60 percent solids content and which is transparent and fluid was obtained. The bis(tributyl tin) oxide content of this compound H is 52.2 percent.

The high molecular organic tin compound H obtained here was used as it is as underwater anti-fouling coating composition of this invention.

EXAMPLE 9

Similar to the manufacturing method of Example 1, 344 parts of phthalic anhydride, 271 parts of trimethylol ethane, 309 parts of linseed oil fatty acid, 122 parts of Carbowax Polyethylene Glycol 1,000 (the same as that used in Example 3), 17 parts of pentaerythritol and 50 parts of xylene were reacted for 5 hours at 230°C, 152 parts of phthalic anhydride and 230 parts of xylene were added further, reacted for 1 hour at 155°C to prepare an alkyd resin solution with a resin acid value of 60 (corresponds to 1.23 mols of carboxyl groups) and then this resin solution was diluted by adding 487 parts of xylene. Next, 293 parts of bis(tributyl tin) oxide (corresponds to 0.493 mol of bis(tributyl tin) oxide) and 113 parts of xylene were added to this and reacted for 4 hours at 140°- 143°C, by which high molecular organic tin compound I of 62 percent solids content and which is transparent and fluid was obtained. The bis(tributyl tin) oxide content of this compound I is 20.4 percent.

The high molecular organic tin compound I obtained here was used as it is as underwater anti-fouling coating composition of this invention.

EXAMPLE 10

Similar to the manufacturing method of Example 1, 344 parts of phthalic anhydride, 271 parts of trimethylol ethane, 309 parts of linseed oil fatty acid, 122 parts of Carbowax Polyethylene Glycol 1,000 (the same as that used in Example 3), 17 parts of pentaerythritol and 50 parts of xylene were reacted for 5 hours at 230°C, 152 parts of phthalic anhydride and 230 parts of xylene were added further, reacted for 1 hour at 155°C to prepare an alkyd resin with an resin acid value of 60 (corresponds to 1.23 mol of carboxyl groups) and then this resin solution was diluted by adding 487 parts of xylene. Next, 365 parts of bis(tributyl tin) oxide (corresponds to 0.615 mol as bis(tributyl tin) oxide) and 113 parts of xylene were added to this and reacted for 4 hours at 140°- 143°C, by which high molecular organic tin compound J of 63 percent solids content and which is transparent and fluid was obtained. The bis(tributyl tin) oxide content of this compound J is 24.2 percent.

The high molecular organic tin compound J obtained here was used as it is as the underwater anti-fouling coating composition of this invention.

EXAMPLE 11

Similar to the manufacturing method of Example 1, 387 parts of phthalic anhydride, 337 parts of trimethylol ethane, 345 parts of fatty acid (its composition is 4 percent saturated fatty acid, 8 percent oleic acid, 47 percent conjugated linolic acid and 41 percent non-conjugated linolic acid) and 50 parts of xylene were reacted for 8 hour at 220°C to make an acid value of about 10, 41 parts of phthalic anhydride and 210 parts of xylene were added further and reacted for 1 hour more at 155°C. An 80 percent alkyd resin solution with resin acid value of 25 was prepared, 138 parts of bis(tributyl tin) oxide and 30 parts of xylene were added, reacted at 140°- 143°C, about 4 parts of condensation water removed and diluted with 489 parts of xylene, by which high molecular organic tin compound K of 61 percent solids content and which is transparent and fluid was obtained. The bis(tributyl tin) oxide content of the compound K is 11.7 percent. The high molecular organic tin compound K obtained here was used as it is as underwater anti-fouling coating composition of this invention.

EXAMPLE 12

Similar to the manufacturing method of Example 1, 387 parts of phthalic anhydride, 337 parts of trimethylol ethane, 345 parts of fatty acid (the same as that used in Example 11), and 50 parts of xylene were reacted for 6 hours at 230°C, 86 parts of phthalic anhydride and 222 parts of xylene were added further, reacted for 1 hour at 153° C to prepare an 80% alkyd resin solution with a resin acid value of 40, 230 parts of bis(tributyl tin) oxide and 55 parts of xylene were added further and reacted for 4 hours at 140°- 143°C and 7 parts of condensation water removed and diluted with 543 parts of xylene, by which high molecular organic tin compound L of 60 percent solids content and which is transparent and fluid was obtained. The bis(tributyl tin) oxide content of this compound L is 17.6 percent. The high molecular organic tin compound L obtained here was used as it is as the un-

EXAMPLE 13

Similar to the manufacturing method of Example 1, 344 parts of phthalic anhydride, 271 parts of trimethylol ethane, 309 parts of linseed oil fatty acid, 122 parts of Carbowax Polyethylene Glycol 1,000 (the same as that used in Example 3), 17 parts of pentaerythritol and 50 parts of xylene were reacted for 5 hours at 230°C, 152 parts of phthalic anhydride and and 280 parts of xylene were added further and reacted for 1 hour more at 155°C to prepare an alkyd resin solution with resin acid value of 60 (corresponds to 1.23 mols of carboxyl groups) and this resin solution was diluted by adding 487 parts of xylene. Four hundred and forty parts of bis(triphenyl tin) oxide (corresponds to 0.615 mol as bis(triphenyl tin) oxide) and 113 parts of xylene were added and reacted for 4 hours at 140°– 143°C to obtain high molecular organic tin compound M of 63 percent solids content and which is transparent and fluid. The bis(triphenyl tin) oxide content of this compound M is 27.8 percent. The high molecular organic tin compound M obtained here was used as it is as the underwater anti-fouling coating coating composition of this invention.

Next, other film-forming elements were added to the high molecular organic tin compounds produced in the above Examples 3 – 9, conventional pigments, extenders and additives or conventional anti-fouling agents were added further if required, dispersed uniformly with a dispersing equipment such as a ball mill, toluene added further and constituents adjusted to obtain the underwater anti-fouling coating composition of this invention.

Formulation examples are indicated below and when not specifically mentioned, formulation examples are indicated as parts by weight. Also, the chlorinated rubber varnish indicated in the formulations refer to Aloprene No. 20 (molecular weight about 9400) which is the trade name of Imperial Chemical Industries, Limited of England.

| Formulation Example 1 | | |
|---|---|---|
| High molecular organic tin compound C (solids content 60%) | | 40 |
| Chlorinated rubber varnish (solids content 45%) | | 10 |
| Rosin varnish (solids content 70%) | | 40 |
| Toluene | | 10 |
| | Total | 100 |

| Formulation Example 2 | | |
|---|---|---|
| High molecular organic tin compound I (solids content 62%) | | 40 |
| Chlorinated rubber varnish (solids content 45%) | | 10 |
| Rosin varnish (solids content 70%) | | 40 |
| Toluene | | 10 |
| | Total | 100 |

| Formulation Example 3 | | |
|---|---|---|
| High molecular organic tin compound C (solids content 60%) | | 30.0 |
| Chlorinated rubber varnish (solids content 45%) | | 5.0 |
| Rosin varnish (solids content 70%) | | 20.0 |
| Tetramethylthiuram disulfide | | 10.0 |
| Zinc oxide | | 5.0 |
| Red iron oxide | | 5.0 |
| Talc | | 14.5 |
| Aluminum stearate | | 0.5 |
| Toluene | | 10.0 |
| | Total | 100.0 |

| Formulation Example 4 | | |
|---|---|---|
| High molecular organic tin compound I (solid content 62%) | | 30.0 |
| Chlorinated rubber varnish (solids content 45%) | | 5.0 |
| Rosin varnish (solids content 70%) | | 20.0 |
| Tetramethylthiuram disulfide | | 10.0 |
| Zinc oxide | | 5.0 |
| Red iron oxide | | 5.0 |
| Talc | | 14.5 |
| Aluminum stearate | | 0.5 |
| Toluene | | 10.0 |
| | Total | 100.0 |

| Formulation Example 5 | | |
|---|---|---|
| High molecular organic tin compound C (solids content 60%) | | 30.0 |
| Rosin Varnish (solids content 70%) | | 20.0 |
| Cuprous oxide | | 15.0 |
| Zinc oxide | | 5.0 |
| Red iron oxide | | 5.0 |
| Talc | | 14.5 |
| Aluminum stearate | | 0.5 |
| Toluene | | 10.0 |
| | Total | 100.0 |

| Formulation Example 6 | | |
|---|---|---|
| High molecular organic tin compound I (solids content 62%) | | 30.0 |
| Rosin varnish (solids content 70%) | | 20.0 |
| Cuprous oxide | | 15.0 |
| Zinc oxide | | 5.0 |
| Red iron oxide | | 5.0 |
| Talc | | 14.5 |
| Aluminum stearate | | 0.5 |
| Toluene | | 10.0 |
| | Total | 100.0 |

Next, the results of performance tests carried out with underwater anti-fouling coating compositions of this invention obtained in Examples 1 – 13 and Formulation Examples 1 – 6, are given below. Also, in order to compare the performance of the conventional anti-fouling paint and the anti-fouling materials of this invention, tests on the coating compositions of this invention were carried out simultaneously with tests on commercial cuprous oxide type steel ships bottom, oil-based anti-fouling paint as the control.

As the method of the test, Kansai Paint Co.'s ships bottom anti-corrosive paint (trade name: Rabamarine Silvertone D) was coated twice with brush at 24 hours interval on a steel plate (300 × 300 × 3.2 mm) as the anti-corrosion primer so that the thickness of one coating was 35 microns. This was left standing for 24 hours and used as the primer-coated test plate. The underwater anti-fouling coating composition of this invention and commercial cuprous oxide type steel ships bottom, oil-based anti-fouling paint were coated once with brush on the test plates in a similar manner as in the coating of anti-corrosion primer, left standing at room temperature for 48 hours and used as the test pieces. The test pieces were submerged for 8 months in the sea water of Shimizu Port, Shizuoka Prefecture, Japan and during this time, they were removed from the water periodically and anti-fouling effect were examined. As a result, superior results were obtained as it was found that the ability of the underwater anti-fouling coating composition of this invention to prevent fouling by adhesion of sea organisms (barnacle, serpula, ascidian, bugul, sea mussel, sea weeds) was equal or better than that of commercial cuprous oxide type steel ships bottom, oil-based anti-fouling paint.

LIST OF RESULTS OF TESTS ON SUBMERGED PERFORMANCE

| Sample (Coating Material: Paint) | Results of submerged test at Shimizu Port (Anti-fouling Effects) | | |
|---|---|---|---|
| | After 60 days | After 120 days | After 240 days |
| Example 1 | +++ | + | — |
| Example 2 | +++ | + | — |
| Example 3 | +++ | ++ | + |
| Example 4 | +++ | ++ | + |
| Example 5 | +++ | ++ | + |
| Example 6 | +++ | ++ | + |
| Example 7 | +++ | +++ | ++ |
| Example 8 | +++ | +++ | ++ |
| Example 9 | +++ | +++ | ++ |
| Example 10 | +++ | +++ | ++ |
| Example 11 | +++ | +++ | ++ |
| Example 12 | +++ | +++ | ++ |
| Example 13 | +++ | ++ | ++ |
| Formulation Example 1 | +++ | + | — |
| Formulation Example 2 | +++ | ++ | + |
| Formulation Example 3 | +++ | +++ | ++ |
| Formulation Example 4 | +++ | +++ | ++ |
| Formulation Example 5 | +++ | +++ | ++ |
| Formulation Example 6 | +++ | + | — |
| Commercial Cuprous Oxide Type Steel Ships Bottom, Oil-based Paint | +++ | + | — |

(Note) The symbols for evaluating the result of submerged performance test in the above List indicate the following:

+++ : Excellent (fouled area below 10 percent)
++ : Good (fouled area about 10 – 20 percent)
+ : Rather good (fouled area about 20 – 30 percent)
— : Rather poor (fouled area about 30 – 50 percent)
—— : Poor (fouled area over about 50 percent)

That is, it is clear that the underwater anti-fouling and insect-proofing coating compositions of this invention generally exhibit superior anti-fouling effect against organisms in the sea as high molecular organic tin compounds are used as anti-fouling poisons and at the same time, function as the film-forming elements.

Next, test examples when anti-fouling treatments are applied to fishing net materials using the high molecular organic tin compounds obtained in Examples 1 – 13 are given. Test Example 1

Xylene was added to the high molecular organic tin compound A obtained in Example 1 and made into a solution of 40 percent solids content. Fishing net for breeding (made by Toyo Net Mfg. Co., material: vinyl chloride fiber, trade name: Envilon, 150 mm mesh) was dipped in this resin solution, squeezed with rubber rolls and dried as it is for 6 hours at room temperature to obtain a net to which anti-fouling treatment has been applied. The weight of the fishing net has increased 13 percent after drying and the weight of the coating per square meter of the net was 20 g.

TEST EXAMPLE 2

A fishing net for breeding (made by Toyo Net Mfg. Co., material: vinyl chloride fiber, trade name: Envilon, 35 mm mesh) was dipped in the 40 percent solids resin solution obtained in Test Example 1, the excess resin solution was removed by the centrifugal method (rotational speed 500 r.p.m.) and air-dried for 4 hours to obtain a net to which anti-fouling treatment has been applied. The weight of the net increased 12 percent after drying and the weight of the coating per square meter of net was 9 g.

TEST EXAMPLE 3

Xylene was added to the high molecular organic tin compound M obtained in Example 13 and the solids content adjusted to 40 percent. A fishing net for breeding (the same as that used in Test Example 1) was dipped in this resin solution, squeezed with rubber rolls and dried as it is at room temperature for 6 hours to obtain a net to which anti-fouling treatment has been applied. The weight of the net increased 10 percent after drying and the weight of the coating per square meter of net was 16 g.

The performance test of fishing nets to which anti-fouling compositions of this invention obtained in the above-mentioned Test Examples 1 – 3 was carried out by the following method.

That is, fishing net (untreated) to which entirely no anti-fouling treatment has been applied and steel ships bottom, oil-based paint as representative of previous anti-fouling material were selected as comparison products for evaluating performance and anti-fouling treatment applied to the same kind of fishing net (untreated) used in Test Example 1.

(1) A square piece with one side 50 cm in length was cut off at random from fishing nets of Test Examples 1 – 3 and the above-mentioned nets for comparison, fixed on a square steel frame with one side 60 cm in length, were immersed for 7 months in sea water in Shimizu Port, Shizuoka Prefecture and removed from the sea periodically every month and the effect of anti-fouling examined. The results are shown in the following table. From the results of this immersion test, the relation between change in adhered quantity of organisms which adhered in the sea (that is, grams of organisms in the sea which adhered to a square fishing net with one side 50 cm in length to which anti-fouling treatment has been applied) and the number of months the fishing net has been immersed in the sea was obtained.

(2) Adhesiveness Test (2.1) 180° Bending Test

The fishing nets of Test Examples 1 – 3 and that to which previous steel ships bottom, oil-based paint has been applied as an anti-fouling agent were cut off to a size of 15 cm × 15 cm before immersion in the sea and on which immersion tests were carried out for 7 months and dried thoroughly. The cut fishing nets were bent around a rod of 2 mm diameter in about 1 second in accordance with ASTM D 1010-58 and the bent portion examined for cracks and peeling. The fishing net was evaluated as "resists bending" when no crack or peeling was observed.

(2.2) Scotch-tape Adhesion Test

A similar fishing net before sea immersion and that which has been immersed in the sea for 7 months were dried thoroughly, a Scotch-tape of about 50 mm in length was pressed against the net cords of the fishing net with the finger tip so that it adheres strongly, the Scotch-tape was peeled off by force rapidly and the length of the portion of the coating which has been peeled off was indicated in percent of the length of the Scotch-tape has been adhered.

The results of the 180° bending test of (2.1) and the Scotch-tape test of (2.2) indicated above are given in the following table.

It was made clear from the above-mentioned sea immersion tests, adhesiveness tests and results of measurement of rate of increase in weight of fishing net after anti-fouling treatment, that the rate of increase in weight of fishing net to which the anti-fouling agent of this invention has been applied is small, the handling of the fishing net is easy, the ability to prevent adherence of organisms in the sea (barnacle, serpula, ascidian, bugul, sea mussel, sea weeds) when immersed in sea is much better than fishing net on which anti-fouling treatment has not been applied and fishing net on which has been coated the previous cuprous oxide type anti-fouling paint, the adhesiveness test (softness, adhesiveness) of the coating composition was very good when compared with the above-mentioned comparison products and there is no danger of peeling, which makes the nets very suitable for fish breeding and for catching fish.

compound functioning as an anti-fouling and also a film-forming component, wherein said high molecular weight organic tin compound is prepared by condensing an alkyd resin having free carboxyl groups and having a resin acid value higher than 20 with a bis(triorgano tin) oxide so that more than 5 percent by weight of triorgano tin oxide groups is present in the alkyd resin at temperatures sufficient to effect the condensation reaction, the oxide being present in an amount less than the equivalent necessary to completely react with the free carboxyl groups of the alkyd resin, said oxide having the general formula:

$$R_2Sn-O-SnR_2$$ (with each Sn bearing two R groups)

wherein R is an alkyl group or a phenyl group having 8 or less carbon atoms.

2. An underwater anti-fouling coating composition according to claim 1, in which said bis(triorgano tin) oxide is at least one compound selected from the group consisting of bis(trimethyl tin) oxide, bis(triethyl tin) oxide, bis(tripropyl tin) oxide, bis(tributyl tin) oxide, bis(tri-n-octyl tin) oxide, bis(tripentyl tin) oxide, bis(trihexyl tin) oxide and bis(triphenyl tin) oxide.

What is claimed is:

1. An underwater anti-fouling coating composition which contains a high molecular weight organic tin Results of sea immersion tests and rates of increase in weight before and after application of anti-fouling composition of various kinds of nets (including drying time of the anti-fouling composition)

| Sample (kind of fishing net) | Rate of increase in weight of fishing net coating (percent) (Note 1) | Drying time of anti-fouling composition (hr.) | After 1 month | After 2 months | After 3 months | After 4 months | After 5 months | After 6 months | After 7 months | Remarks |
|---|---|---|---|---|---|---|---|---|---|---|
| Test Example 1 | 18 | 6 | 50 | 20 | 30 | 30 | 13 | 20 | 15 | |
| Test Example 2 | 12 | 4 | 70 | 70 | 90 | 150 | 100 | 200 | 200 | |
| Test Example 3 | 10 | 6 | 90 | 40 | 40 | 50 | 30 | 40 | 60 | |
| Comparison product: Previous product | 96 | 8 | 150 | 250 | 200 | 700 | 3,000 | 3,000 | 4,000 | Excessive peeling. |
| Comparison product: Untreated product | | | 80 | 300 | 500 | 800 | 3,000 | 4,000 | 4,000 | |

NOTE 1.—

$$\text{Rate of increase in weight of coating of fishing net (percent)} = \frac{(\text{weight of fishing net after treatment}) - (\text{weight of fishing net before treatment})}{(\text{weight of fishing net before treatment})} \times 100.$$

NOTE 2.—Result of sea immersion test (weight of organisms adhere in sea (g)) = (weight of fishing net at time of observation) − (weight of fishing net at beginning of sea immersion).

RESULTS OF ADHESIVENESS TESTS

| | Tests results | | | | | | | |
|---|---|---|---|---|---|---|---|---|
| | Fishing net of test example 1 | | Fishing net of test example 2 | | Fishing net of test example 3 | | Comparison product | |
| | Before immersion | 7 months after immersion | Before immersion | 7 months after immersion | Before immersion | 7 months after immersion | Before immersion | 7 months after immersion |
| 180° bending test | Withstands bending. | Slight cracking. | Withstands bending. | Withstands bending. | Withstands bending. | Slight cracking. | Excessive cracking. | Excessive cracking and peeling. |
| Scotch-tape adhesiveness test | 0% | 0% | 0% | 0% | 0% | 0% | 30% | 100%. |